United States Patent [19]

LaGrone

[11] 4,339,917
[45] Jul. 20, 1982

[54] FUEL DELIVERY SYSTEM AND METHOD
[75] Inventor: Charles H. LaGrone, Tempe, Ariz.
[73] Assignee: The Garrett Corporation, Los Angeles, Calif.
[21] Appl. No.: 48,288
[22] Filed: Jun. 13, 1979
[51] Int. Cl.³ .............................................. F02C 9/38
[52] U.S. Cl. ............................... 60/39.28 R; 417/266; 137/566
[58] Field of Search .................. 60/34.28 R; 417/245, 417/266; 137/566

[56] References Cited

U.S. PATENT DOCUMENTS

| | | | |
|---|---|---|---|
| 1,857,004 | 5/1932 | Ribillet | 137/566 |
| 2,062,231 | 11/1936 | Ornstein | 137/566 |
| 2,598,307 | 5/1952 | Rutgers | 137/566 |
| 2,781,831 | 2/1957 | Angell | 417/245 |
| 2,823,518 | 2/1958 | Murray | 137/566 |
| 3,004,494 | 10/1961 | Corbett | 417/245 |
| 3,043,104 | 7/1962 | Magnus | 60/39.28 R |
| 3,275,061 | 9/1966 | Williams et al. | 137/566 |
| 3,279,522 | 10/1966 | Norris et al. | 137/566 |
| 3,627,239 | 12/1971 | Hull | 60/34.28 R |
| 3,730,646 | 5/1973 | Affri et al. | 137/566 |
| 3,736,072 | 5/1973 | Turner et al. | 60/34.28 R |
| 4,073,136 | 2/1978 | Symon | 60/39.28 R |

Primary Examiner—Robert E. Garrett
Attorney, Agent, or Firm—James W. McFarland; Albert J. Miller

[57] ABSTRACT

A fuel delivery system for supplying high pressure fuel flow to a gas turbine engine which includes a first stage ejector pump driven by a second stage compressor which is driven by a hydraulically operated turbine supplied with fuel flow from a third stage gear pump.

12 Claims, 1 Drawing Figure

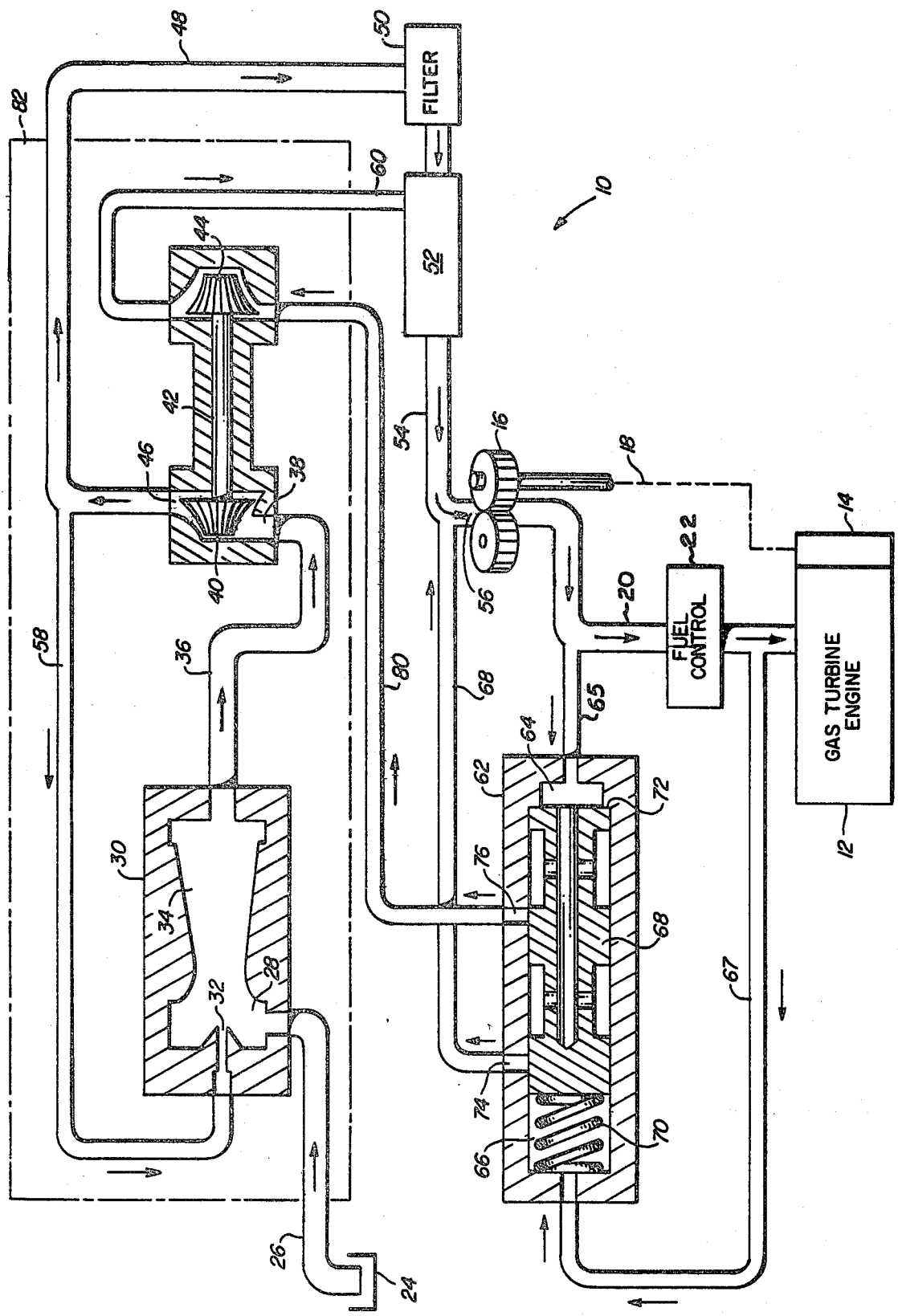

FUEL DELIVERY SYSTEM AND METHOD

BACKGROUND OF THE INVENTION

The Government has rights in this invention pursuant to Contract No. N00019-75-C-0424 awarded by the Department of the Navy.

This invention relates to fuel control systems and relates more particularly to an improved system and method for delivering fuel flow to a gas turbine engine.

In many applications of gas turbine engines, such as those utilized on aircraft, it is important that the fuel delivery system be able to draw fuel from a low pressure reservoir at relatively high vapor-to-liquid ratios. It has been conventional practice to use several stages of fuel pumps, some with different operating characteristics, to improve the fuel delivery capabilities. It is also known that utilization of an ejector or jet boost pump improves the suction capability of a fluid delivery system. Prior fuel delivery systems for gas turbine engines suffer several drawbacks however. Of utmost concern is the relatively limited suction capability, or limited vapor-to-liquid ratio, of the fuel delivery systems. Further, such prior art systems become cumbersome and relatively expensive due to utilization of electrical power for one or more of the fuel pumps, and/or limitation of suction capability due to heat absorbed from the gas turbine engine when the pumping stages are mechanically driven.

SUMMARY OF THE INVENTION

Accordingly, it is the broad object of the present invention to provide an improved fuel delivery system and method having high vapor-to-liquid ratio suction capability.

A more particular objection of the present invention is to provide such a system and method which utilizes an ejector pump so arranged and powered that it can be isolated from engine heat to improve its suction capability.

Another object of the present invention is to provide such an improved fuel delivery system and method of simple, economical structure which utilizes no electrical power and which can be adapted to existing fuel delivery systems with very minor design changes.

In summary, the present invention contemplates a fuel delivery system and method which utilizes a first stage ejector pump that delivers fuel to a second stage centrifugal pump. Exhaust flow from the centrifugal pump is delivered to the primary, positive displacement fuel pump which is mechanically driven by the gas turbine engine. Exhaust flow from the main pump drives a hydraulic turbine which powers the centrifugal pump so that the centifugal pump can be isolated from engine heat. Exhaust flow from the centifugal pump is also directed to the aspirating nozzle of the ejector pump to produce the aspirating action thereof.

These and other more particular objects and advantages of the present invention are specifically set forth in or will become apparent from the following detailed description of a preferred embodiment of the invention when read in conjunction with the accompanying drawing.

BRIEF DESCRIPTION OF THE DRAWING

The single FIGURE is a partially schematic, partially cross-sectional diagram of a fuel pumping system as contemplated by the present invention.

DETAILED DESCRIPTION OF THE PREFERRED EMBODIMENT

Referring now more particularly to the drawing, a fuel delivery system generally denoted by the numeral 10 is shown in conjunction with a gas turbine engine 12 having an associated gear box 14 which drives a primary, positive displacement gear pump 16 through a mechanical connection shown schematically by dotted line 18. Pump 16 generates a high pressure exhaust flow through a delivery duct 20 to a fuel control shown schematically at 22 for subsequent delivery to the engine 12.

Fuel delivery system 10 further includes a reservoir 24 for relatively low pressure fuel which is drawn through a conduit 26 to an eductor type intake port 28 of an ejector or jet boost pump 30 that effects an aspirating action in drawing fuel from reservoir 24. Ejector pump 30 further includes aspirating nozzle means in the form of a nozzle 32 disposed in alignment with an eductor type exhaust port 34. Conduit 36 delivers exhaust flow from the ejector pump to an intake port 38 of a centrifugal type compressor pump 40. Centrifugal pump 40 is mechanically driven via shaft 42 by a hydraulically operated turbine 44. From the exhaust port 46 of centrifugal compressor 40, fuel flow at a higher pressure is delivered through a conduit 48, across a filter 50 and through an additional reservoir 52 to conduit 54 which leads to the intak port 56 of pump 16. A pressure boost feedback conduit 58 directs a portion of the higher pressure exhaust fuel flow from centrifugal pump 40 to aspirating nozzle 52 of ejector pump 30. Exhaust from the exhaust port of turbine 44 is also directed via conduit 60 to the reservoir 52.

A pressure differential control valve 62 includes opposed inlet passages 64, 66 which respectively communicates via conduits 65, 67 with the primary delivery duct 20 at locations upstream and downstream of fuel control 22. Accordingly, the pressure differential across fuel control 22 is applied to opposite ends of a movable valve spool 68 within the pressure differential valve 62. Spool 68 is biased rightwardly by a spring 70 towards to rest position illustrated wherein the right hand end of spool 68 abuts a shoulder 72 of the valve 62. Valve 62 further includes first and second bypass ports 74 and 76. Initial leftward movement of spool 68 from the position illustrated first permits fluid communication between passage 64 and second bypass port 76, while further leftward movement of spool 68 then opens communication between passage 64 and first bypass port 74 for delivery through bypass conduit 78 back to the inlet port 56 of gear pump 16. A feedback conduit 80 connects the second bypass port 76 with the intake port of turbine 44.

Upon starting the engine 12 and rotating the gear pump 16, the extra reservoir 52 presents an immediate source of fuel to the pump 16. Thus, upon engine starting, the valve spool 64 immediately shifts slightly leftwardly to deliver motive fuel flow from conduit 65 through second bypass port 76 and feedback conduit 80 to initiate rotation of turbine 44 and centrifugal pump 40.

The fuel delivery system 10 draws fuel flow at a very high vapor-to-liquid ratios of up to 0.5 from reservoir 24 to inlet port 28 of the ejector pump. Pressurized fuel flow from the ejector pump is then boosted in pressure by the centrifugal pump 40 before reaching the inlet of the main gear pump 16. The exhaust fluid flow from the centrifugal pump passes through aspirating nozzle 32 of ejector pump 30 to produce a fluid stream of relative high velocity fuel flow adjacent the eductor inlet 28 and in alignment with the educator exhaust 34 to draw or aspirate the ejector inlet fuel flow.

Throughout engine operation the pressure differential valve 62, being responsive to the pressures upstream and downstream of the fuel control 22, delivers excess fuel flow from the exhaust port of the main gear pump 16 to the bypass ports 74 and 76. Valve 62 is constructed so as to provide flow on a priority basis first to the feedback conduit 80 to assure continued operation of turbine 44 and compressor 40. In this respect it will be apparent that a first portion of the excess fluid flow in delivery duct 20 is directed through second bypass duct 76 to turbine 44, while any remaining excess fluid flow passes through the first bypass duct 74 to be returned to the intake port 56 of the main gear pump.

In this manner it will be apparent that the fuel delivery system 10 comprises first, second, and third pumping means all arranged serially with respect to the reservoir 24 and the gas turbine engine 12, to sequentially pump the fuel flow to the gas turbine engine. Further, by utilization of the hydraulically driven turbine 44, only the main or primary gear pump 16 is mechanically driven by the gas turbine engine, and no electrical drive for the fuel system is required.

An important advantage of the present invention is associated with utilization of the hydraulic turbine 44, along with use of exhaust flow from the centrifugal pump 40 as inlet flow to the aspirating nozzle 32 of the ejector pump. This is quite important in certain applications of gas turbine engines because of the large heat source presented by the transmission 14 which soaks back into the primary gear pump 16 to significantly increase the temperature of the fuel flow at that location. However, the exhaust fuel flow from the centrifugal pump 40 can be maintained at a relatively low temperature. Note that hotter fuel flow driving turbine 44 does not mix with exhaust flow from pump 40 until far downstream from feedback conduit 58. Thus, a relative low temperature fluid is utilized at the input for aspirating nozzle 32. This dramatically improves the suction capability of the ejector pump 30, permitting the fuel delivery system to operate to vapor-to-liquid ratios of up to 0.5. The entire portion of fuel delivery system 10 encompassed by, and/or upstream of the dashed line 82 can be thermally isolated, if desired, from the remainder of the system to further cool exhaust flow from pump 40 and improve the ejector pump suction capability.

From the foregoing it will be apparent that the present invention provides an improved method for delivering pressurized fuel flow from a reservoir to a gas turbine engine which includes the steps of driving the main gear pump 16 by rotary power developed by the engine 12, delivering high pressure fuel flow from the primary pump 16 to the engine 12, hydraulically driving turbine 44 by overage or excess fuel flow from the main gear pump, in turn mechanically driving the centrifugal pump 40 by the turbine such that the exhaust flow from the centrifugal pump is delivered to the primary gear pump 16, and is also delivered through feedback conduit 58 to the aspirating nozzle 32 of the first stage ejector pump 30, so that the ejector pump 30 may draw fuel from the reservoir at vapor-to-liquid ratios of up to 0.5.

Various modifications and alterations to the above described system will be apparent to those skilled in the art. Accordingly, the foregoing detailed description of the preferred embodiment of the invention should be considered exemplary in nature and not as limiting to the scope and spirit of the invention as set forth in the appended claims.

Having described the invention in sufficient clarity that those skilled in the art may be and use it, I claim:

1. A fuel delivery system for a gas turbine engine comprising:
   a fuel tank:
   an ejector pump having nozzle means, an intake port communicating with said fuel tank, and an exhaust port;
   first and second pumps disposed serially downstream of said ejector pump for pumping fuel flow to said engine, each of said first and second pumps having intake and exhaust ports, said exhaust port of the first pump feeding fuel flow to said intake port of the second pump;
   a turbine driven by exhaust flow from said exhaust port of the second pump, said turbine operatively connected to mechanically driven said first pump;
   a pressure boost feedback conduit delivering flow from said exhaust port of the first pump to said nozzle means of the ejector pump;
   said second pump being a positive displacement pump;
   fuel control means disposed downstream of said positive displacement pump for controlling fuel flow to said engine;
   a pressure differential control valve responsive to pressure upstream and downstream of said fuel control means, said control valve operable to bypass excess exhaust flow from said exhaust port of the positive displacement pump back to said intake port to maintain a substantially constant pressure differential across said fuel control means, said control valve including first and second bypass ports;
   a first bypass conduit extending from said first bypass port to said intake port of the positive displacement pump; and
   a second bypass conduit extending from said second bypass port to said turbine for delivering motive flow thereto.

2. A fuel delivery system as set forth in claim 1, wherein said first pump is a centrifugal compressor mechanically driven by said turbine.

3. A fuel delivery system as set forth in claim 2, further including a drive coupling between said second pump and said engine.

4. A fuel delivery system as set forth in claim 1, wherein said control valve is operable to deliver a first priority portion of said excess flow to said second bypass port, and to deliver any remaining portion of said excess exhaust flow to said first bypass port.

5. A fuel delivery system as set forth in claim 4, wherein exhaust flow from said turbine is delivered to said intake port of the positive displacement pump.

6. A fuel delivery system as set forth in claim 4, wherein said feedback conduit communicates with said exhaust port of the first pump upstream of the location of co-mingling of said exhaust flows of said first pump and said turbine.

7. A fuel delivery system for a gas turbine engine comprising:
   a fuel tank;
   a relatively high pressure fuel delivery duct for feeding fuel flow to said engine;
   fuel pump means comprising an ejector pump having nozzle means, a centrifugal pump, and a positive displacement pump arranged sequentially in series between said fuel tank and said delivery duct;
   a turbine driven exhaust flow from said positive displacement pump and operatively interconnected to mechanically drive said centrifugal pump;
   a pressure boost feedback line delivery exhaust flow from said centrifugal pump to said nozzle means of the ejector pump; and
   a flow divider valve disposed between said exhaust port of the positive displacement pump and said delivery duct, said flow divider valve operable to direct a portion of the exhaust flow from said positive displacement pump to said turbine and to deliver required fuel flow to said delivery duct, said flow divider valve further operable to return excess flow from said positive displacement pump to said intake port of the positive displacement pump.

8. A fuel delivery system as set forth in claim 7, wherein said turbine is arranged whereby exhaust flow therefrom is delivered to an intake port of said positive displacement pump.

9. In combination:
   a gas turbine engine;
   a reservoir for fuel;
   an ejector pump receiving fuel flow from the reservoir, said ejector pump having nozzle means;
   a compressor having an intake port receiving fuel flow from said ejector pump, said compressor discharging fuel flow through an exhaust port at a higher pressure;
   a feedback line delivering exhaust flow from said compressor exhaust port to said nozzle means of said ejector pump;
   a turbine having fuel intake and exhaust ports, said turbine operably connected to mechanically drive said compressor;
   a positive displacement gear pump operatively connected to be mechanically driven by said engine and having an intake port receiving fuel flow from said exhaust ports of the compressor and the turbine, said positive displacement gear pump having an exhaust port for delivering fuel flow to said engine; and
   a control valve operable to deliver a first priority portion of excess exhaust flow from said exhaust port of the positive displacement gear pump to said intake port of the turbine for driving said turbine, and to deliver any remaining portion of said excess exhaust flow to said intake port of the positive displacement pump.

10. A fuel feed system for delivering high pressure, relatively high temperature fuel flow to a gas turbine engine, comprising:
    a fuel tank;
    an ejector pump having an intake ejector port communicating with and receiving fuel flow from said fuel tank at a relative high vapor-to-liquid ratio, said ejector pump having an exhaust eductor port and a jet nozzle arranged to aspirate fuel flow from said intake to said exhaust eductor port of the ejector pump;
    a centrifugal pump having an intake port receiving fuel flow from said exhaust eductor port of the ejector pump, said centrifugal pump having an exhaust port for exhausting fuel flow at a higher pressure;
    a pressure feedback line extending from said exhaust port of the centrifugal pump to said nozzle means of the ejector pump for effecting said aspirating action of said ejector pump;
    a positive displacement primary fuel pump mechanically driven by said engine and having an intake port receiving fuel flow from said exhaust port of the centrifugal pump in parallel flow arrangement to said nozzle means of the ejector pump, said main positive displacement gear pump having an exhaust port for delivering relatively high pressure fuel flow to said engine;
    fuel control means disposed between said exhaust port of the primary positive displacement pump and said engine for controlling fuel flow to said engine;
    a three-way pressure differential control valve having an inlet port receiving fuel flow from said exhaust port of the main positive displacement pump, first and second exhaust ports, a pressure sensing port for sensing pressure of fuel flow downstream of said fuel control means, and a shiftable spool having opposed ends respectively exposed to pressure upstream and downstream of said fuel control means and in response thereto for variably metering fuel flow from said inlet of the pressure differential valve to said first exhaust port for maintaining a substantially constant pressure differential across said fuel control means, said first exhaust port of the pressure differential valve communicating with said intake port of the main positive displacement pump;
    a liquid operated turbine operatively connected to mechanically drive said centrifugal pump, said turbine having an exhaust port for delivering exhaust fuel flow therefrom to said intake port of the main positive displacement pump; and
    a second feedback line extending from said second exhuast port of the pressure differential valve to an intake port of the turbine, said pressure differential valve operable to deliver motive fuel flow said exhaust port of the main positive displacement pump to the intake of said turbine for driving said turbine and centrifugal pump.

11. A fuel delivery system for a gas turbine engine, comprising:
    a fuel reservoir;
    first, second, and third pumping means arranged serially between said reservoir and said engine for sequentially pumping fuel flow to said engine, said first pumping means comprising an ejector pump having an aspirating nozzle;
    a turbine operatively connected to mechanically drive said second pumping means;
    means for delivering exhaust fuel flow from said second pumping means to said nozzle; and
    control means for delivering required fuel flow to said engine while bypassing a first priority portion of excess exhaust flow from said third pumping means to said turbine to drive said turbine, and to deliver any remaining portion of said excess exhaust flow to a flow intake port of said third pumping means.

12. A method for supplying fuel flow from a low pressure reservoir to a positive displacement fuel pump which delivers high pressure fuel flow to a gas turbine engine, comprising the steps of:
- drawing fuel from said reservoir at a vapor-to-liquid radio of up to 0.5 by use of an aspirating ejector pump having an aspirating nozzle;
- directing exhaust fuel flow from the ejector pump to a centrifugal compressor;
- mechanically driving said centrifugal compressor by a turbine;
- hydraulically driving said turbine by a priority portion of said high pressure fuel flow delivered by said positive displacement fuel pump in excess of that required by the engine;
- bypassing any remaning portion of excess high pressure fuel flow beyond said priority portion back to the intake of said positive displacement fuel pump;
- delivering a portion of exhaust fuel flow from the centrifugal compressor to said aspirating nozzle to effect aspiration of fuel flow by said ejector pump; and
- delivering the remainder of said exhaust flow from the compressor to the positive displacement fuel pump.

* * * * *